United States Patent
Hsu et al.

(10) Patent No.: US 7,145,950 B2
(45) Date of Patent: Dec. 5, 2006

(54) METHOD OF MOTION VECTOR DETERMINATION IN DIGITAL VIDEO COMPRESSION

(75) Inventors: Chun-Ming Hsu, Taipei (TW); Ai-Chieh Lu, Taipei Hsien (TW); Yueh-Yi Wang, Tai-Chung (TW)

(73) Assignee: Primax Electronics Ltd., Taipei (TW)

( * ) Notice: Subject to any disclaimer, the term of this patent is extended or adjusted under 35 U.S.C. 154(b) by 708 days.

(21) Appl. No.: 10/604,357

(22) Filed: Jul. 14, 2003

(65) Prior Publication Data

US 2005/0013364 A1    Jan. 20, 2005

(51) Int. Cl.
*H04B 1/66* (2006.01)
*H04N 7/12* (2006.01)

(52) U.S. Cl. .................................. 375/240.16
(58) Field of Classification Search ...................... None
See application file for complete search history.

(56) References Cited

U.S. PATENT DOCUMENTS 6,195,389 B1    2/2001   Rodriguez
6,842,483 B1 *  1/2005   Au et al. ............... 375/240.16
6,891,891 B1 *  5/2005   Pau et al. .............. 375/240.16
6,996,175 B1 *  2/2006   Olivieri ................. 375/240.16
2003/0103568 A1 * 6/2003 Lee et al. ............... 375/240.16

FOREIGN PATENT DOCUMENTS

CN         1378750 A      11/2002

* cited by examiner

*Primary Examiner*—Nhon Diep
(74) *Attorney, Agent, or Firm*—Winston Hsu

(57) ABSTRACT

Pixel information of a current block is correlated with pixel information of a reference frame indicated by a first motion vector of a block proximate to the current block, pixel information of the reference frame indicated by a second motion vector of a block of the reference frame spatially coincident with the current block, and pixel information of predetermined regions of the reference frame. At least one of the first, second, and third motion vectors having the lowest cost function is selected as a candidate motion vector. Pixel information of the current block is correlated with pixel information of regions offset from the regions indicated by the candidate motion vectors to determine refined candidate motion vectors and corresponding refined cost functions. The refined candidate motion vector having the lowest refined cost function is selected as the motion vector of the current block.

9 Claims, 6 Drawing Sheets

METHOD OF MOTION VECTOR DETERMINATION IN DIGITAL VIDEO COMPRESSION

BACKGROUND OF INVENTION

1. Field of the Invention

The present invention relates to digital video, and more specifically, to digital video compression techniques using motion estimation.

2. Description of the Prior Art

Digital video is a popular means of information communication. Computer-based video conferencing and digital television are just two examples of applications of this technology. As a single digital image can contain hundreds of thousands of pixels and many sequential image frames are required to produce a quality video effect, compression schemes are required for efficiency in processing time and storage space.

In general, image compression is effected by determiningcorrelations among regions of pixels. When high compression is required due to limits in data transmission speeds for example, either video quality must be sacrificed or additional compression hardware and software must be provided. Where low amounts of compression are tolerable, video quality can be maintained at the cost of an increase in memory demand. Among this complex arrangement of trade-offs, any increase in compression that does not significantly lower video quality or increase the necessary hardware is undoubtedly beneficial.

Referring to FIG. 1, consider a typical digital video 10 displaying an image 12 with a current frame 14 and a previous frame 16. The current frame 14 is made up of pixels 20 of a video memory or display device such as a computer monitor or digital television set. A set of pixels 20 can be grouped into a current block 18 for the purposes of video compression, which is typically facilitated by motion estimation. Examples of state-of-the-art motion estimation compression schemes are MPEG-1 and MPEG-2, although others are widely known and used.

During motion estimation, temporal redundancies of video frames are used to minimize data repetition thereby providing compression. Pixel information of a block undergoing compression, such as the block 18, is compared with pixel information of the previous frame 16. Specifically, the previous frame 16 is searched for a predictor region 22 that contains a substantial amount of pixel data of the block 18. Once a suitable predictor region is found, it is identified by a motion vector, which indicates the position of the predictor region 22 relative to the current block 18. That is, the data of the block 18 comprises a motion vector indicating the location of the predictor region 22 in the previous frame 16, as well as any data representing variations in pixel information from the predictor region 22. Thus, the block 18 of the current frame 14 can be defined in terms of its displacement from the previous frame 16.

There are numerous ways to search the previous frame, or reference frame, for a suitable predictor block. These range from slow pixel-based full search methods to sampling fast motion estimation methods. FIG. 2 illustrates the well-known three-step fast motion estimation method. A region 30 represents the area of the reference frame to be searched, in which nodes of the grid represent predetermined search regions. A search region may be of any size, from a single pixel to a large array of pixels, and is typically the same size as the block to be compressed, which is also typically spatially coincident with the center region R1. According to the first step of the three-step method, pixel information of the block to be compressed, the current block, is compared with the pixel information of the search regions R1–R9. Values of a cost function defining the correlation of pixel information are determined for each region R1–R9, and the region having the lowest cost function (region R4 in FIG. 2) is selected for the second step. In step two, search regions S2–S9 surrounding region R4 are compared with the pixel information of the current block, and again a region having the lowest cost function (region S7 in this case) is selected for the third and final step. Finally, the third step compares the current block with search regions T2–T9, of which the region having the lowest cost function (region T2) is selected as the region that best matches current block. The result of the third step is location of the predictor region for the current block being compressed, and such result can be identified by a motion vector (for region T2 this would be a vector (1,3)) in the reference frame.

Typically, the cost function is a sum of absolute differences (SAD) or a sum of squared differences (SSD) as expressed by the following functions:

$$SAD(u, v) = \sum_{i=1}^{N}\sum_{j=1}^{M} |P_{curr}(i, j) - P_{ref}(i+u, j+v)|$$

$$SSD(u, v) = \sum_{i=1}^{N}\sum_{j=1}^{M} [P_{curr}(i, j) - P_{ref}(i+u, j+v)]^2$$

where, $P_{curr}$ is pixel data, such as a luminance_value, of the current block being compressed; $P_{ref}$ is pixel data of a search region in the reference frame (such as regions R1–R9, S2–S9, T2–T9 of FIG. 2);

i, j are horizontal and vertical indices of the pixels of the current block and search regions;

N, M are the horizontal and vertical sizes of the current block and search regions; and u, v are horizontal and vertical offsets of the search regions of the reference frame with respect to the location current block in the current frame (for region R5, u=–4 and v=0).

Although not without its benefits, the three-step method can suffer from a local minimum deficiency. For instance, in the example of FIG. 2, although in the first step the region R4 was found to best correlate with the current block, a region X1 may actually provide the lowest overall cost function. In detail, given the search region 30, suppose the actual motion vector is defined by X1. Using the three-step search as an exemplary motion estimation method, during the first step, the three-step process may determine the candidate with the smallest cost function to be R4. Following the direction of R4, the three-step search may ultimately lead to an incorrect motion vector such as that defined by T2. This is because, once a region is selected in the first step, the result of the three-step search is limited to proximate regions. The three-step method provides no contingency for this effect, that is, after the region R4 is selected in the first step, the most suitable region X1 cannot be arrived at during the second and third steps. This local minimum deficiency can be found in other state-of-the-art methods as well.

SUMMARY OF INVENTION

It is therefore a primary objective of the claimed invention to provide a method of determining a motion vector for a current block that considers motion vectors of a block proximate to the current block, a coincident block in a different frame, and a predefined search pattern to reduce the probability of a local minimum error.

Briefly summarized, the claimed invention method correlates pixel information of a current block with: (a) pixel information of a reference frame indicated by a first motion vector of a block proximate to the current block, (b) pixel information of the reference frame indicated by a second motion vector, the second motion vector being of a block of the reference frame spatially coincident with the current block, and (c) pixel information of predetermined regions of the reference frame. Corresponding cost functions of the motion vectors are determined before the method selects at least one of the first, second, and third motion vectors having the lowest cost function as a candidate motion vector. The method then further correlates pixel information of the current block with pixel information of regionsoffset from the regions indicated by the candidate motion vectors to determine refined candidate motion vectors and corresponding refined cost functions, before finally, selecting the refined candidate motion vector having the lowest refined cost function as the motion vector of the current block.

According to the claimed invention, each of the first and second motion vectors can be discarded if the corresponding cost function is above a threshold level.

It is an advantage of the claimed invention that the motion vector of the proximate block as well as those of a coincident block and predefined regions are considered as candidates for the current block, thereby improving the accuracy of motion vector determination.

It is a further advantage of the claimed invention that a proximate block motion vector and a coincident block motion vector are discarded when the corresponding cost functions are above the threshold level, thereby speeding the process of motion vector determination when pixel information of the proximate block correlates poorly with that of the current block.

These and other objectives of the claimed invention will no doubt become obvious to those of ordinary skill in the art after reading the following detailed description of the preferred embodiment that is illustrated in the various figures and drawings.

DETAILED DESCRIPTION

Figure 3:
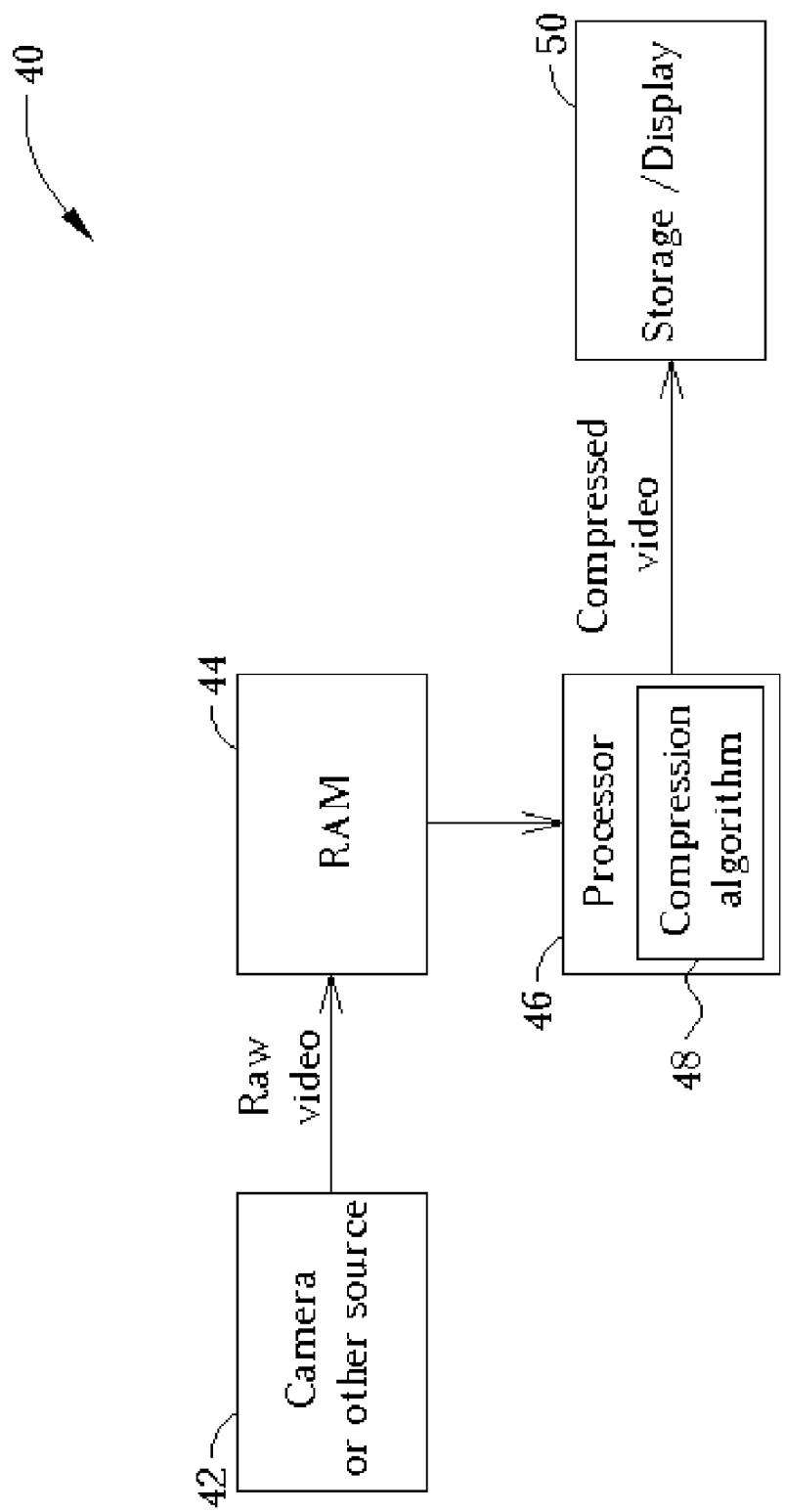
FIG. 3 is a block diagram of a video system for performing the present invention method.

General:

FIG. 3 illustrates a video system 40 capable of performing the present invention motion vector determination method. The video system comprises a random-access memory 44 and a processor 46 for executing a compression algorithm 48 according to the present invention. The compression algorithm may be stored in the RAM 44 or in a similar memory dedicated to the processor. The video system 40 receives a raw video signal from a video source 42, such as a digital video camera, at the RAM 44 though an interface (not shown). The processor 46 then executes the compression algorithm 48 on the raw video data stored in the RAM 44 and outputs compressed video data to a display or storage device 50 via an output interface (not shown). In practical applications, the video source 42 may be a recorded or live program digitally broadcast to a digital television set comprising the RAM 44, processor 46, and display 50. Likewise, the source 42 may be a computer-based digital camera, with the RAM 44 and processor 46 being part of the computer, the display device 50 being a remote monitor to which compressed video is sent across a network.

Figure 4:
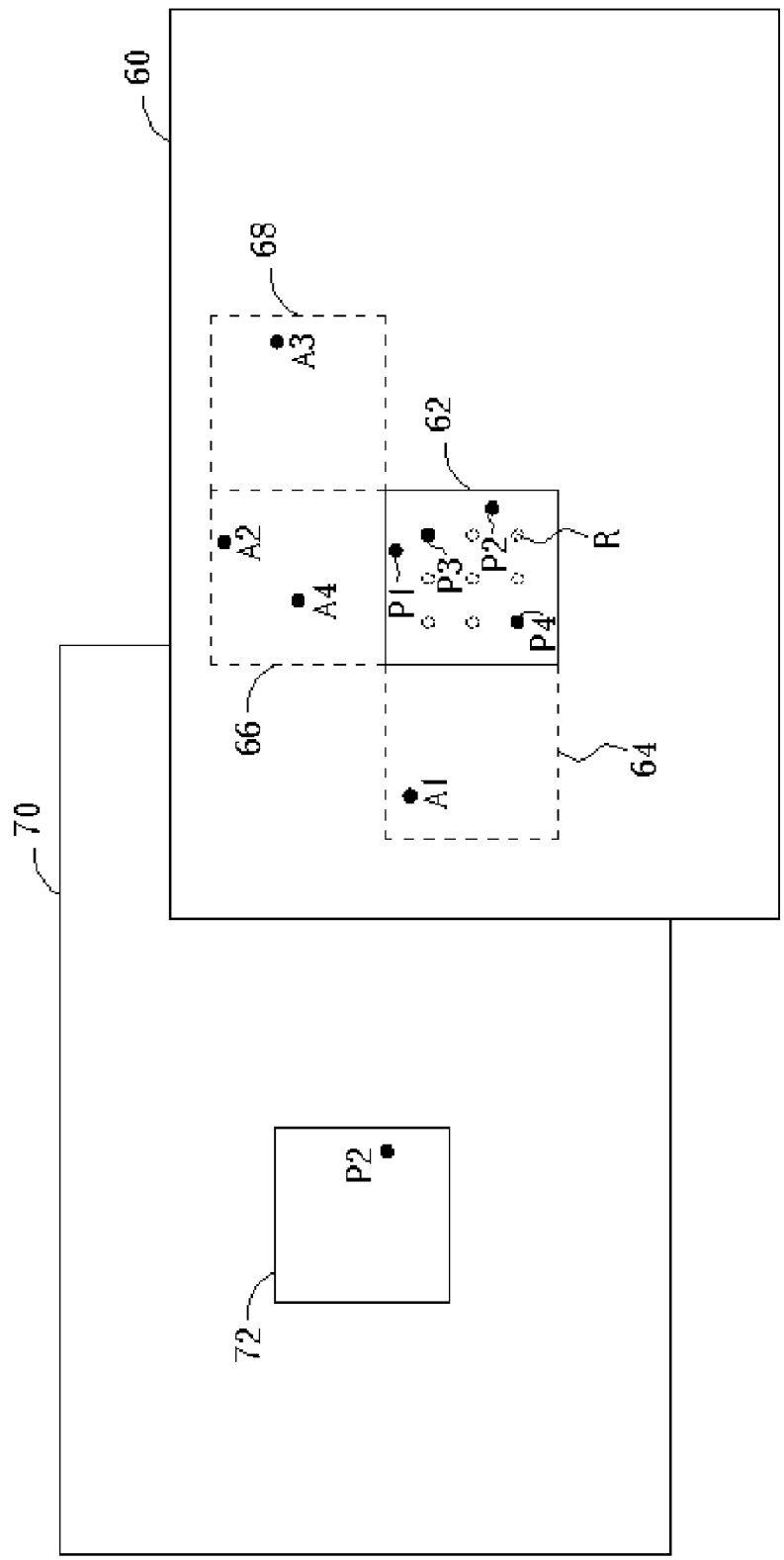
FIG. 4 is a schematic diagram of the present invention method.

FIG. 4 illustrates a schematic diagram of a preferred embodiment of the present invention method. Two frames of a digital video are shown, a current frame 60 and a reference frame (reference image) 70. The reference frame 70 is typically the immediately previous frame, but this is not a requirement. Pixel information of blocks of the current frame 60 to be compressed, and at any given time, a current block 62 is undergoing compression. The present invention considers three sets of motion vectors for compression of the pixel information of current block: motion vectors of nearby (proximate) blocks, a motion vector of a block at the same spatial location but in a different frame, and motion vectors determined by predefined locations relative to the location of the current block. Cost functions of these candidate motion vectors are then compared according to predetermined rules to determine two most suitable motion vectors for further correlation. Finally, after further correlation utilizing any number of well-known methods, the motion having the lowest cost function value is selectedfrom the candidates as the motion vector of the current block.

Proximate Blocks:

Referring to FIG. 4, blocks 64, 66, 68 proximate to the current block 62 are selected. The specific proximate blocks can be selected according to sound design procedures, with proximate blocks already having motion vectors determined being efficient choices. Though three proximate blocks 64, 66, 68 are selected in the preferred embodiment, any number of proximate blocks can be used. Respective motion vectors A1, A2, A3 (shown as points in FIG. 4) of the proximate blocks 64, 66, 68 and the mean of these motion vectors A4 are then compared. Specifically, pixel information of the current block 62 is compared to pixel information of regions in the reference image 70 spatially relative to the current block 62 as indicated by the motion vectors A1, A2, A3, A4. For instance, the motion vector A1 of the proximate region 64 is used to locate a region in the reference image 70 relative to a position in the reference image 70 corresponding to the position of the current block 62 in the current frame 60. As an example, if the coordinates of the current block 62 in the current frame 60 are (64, 48) and the motion vector A1 is (−3, −2), pixel information of the region at (61,48) in the reference image 70 would be correlated to pixel information of the current block 62. Such comparison of pixel information is a cost function comparison and can be performed according to any well-known method such as the SAD or SSD methods previously described. The motion vector of the motion vectors A1, A2, A3, A4 having the lowest cost function value, i.e. best correlation, is then selected as a potential motion vector or point P1. Naturally, in other embodiments, more than one motion vector A1, A2, A3, A4 could be selected for consideration.

Figure 5:
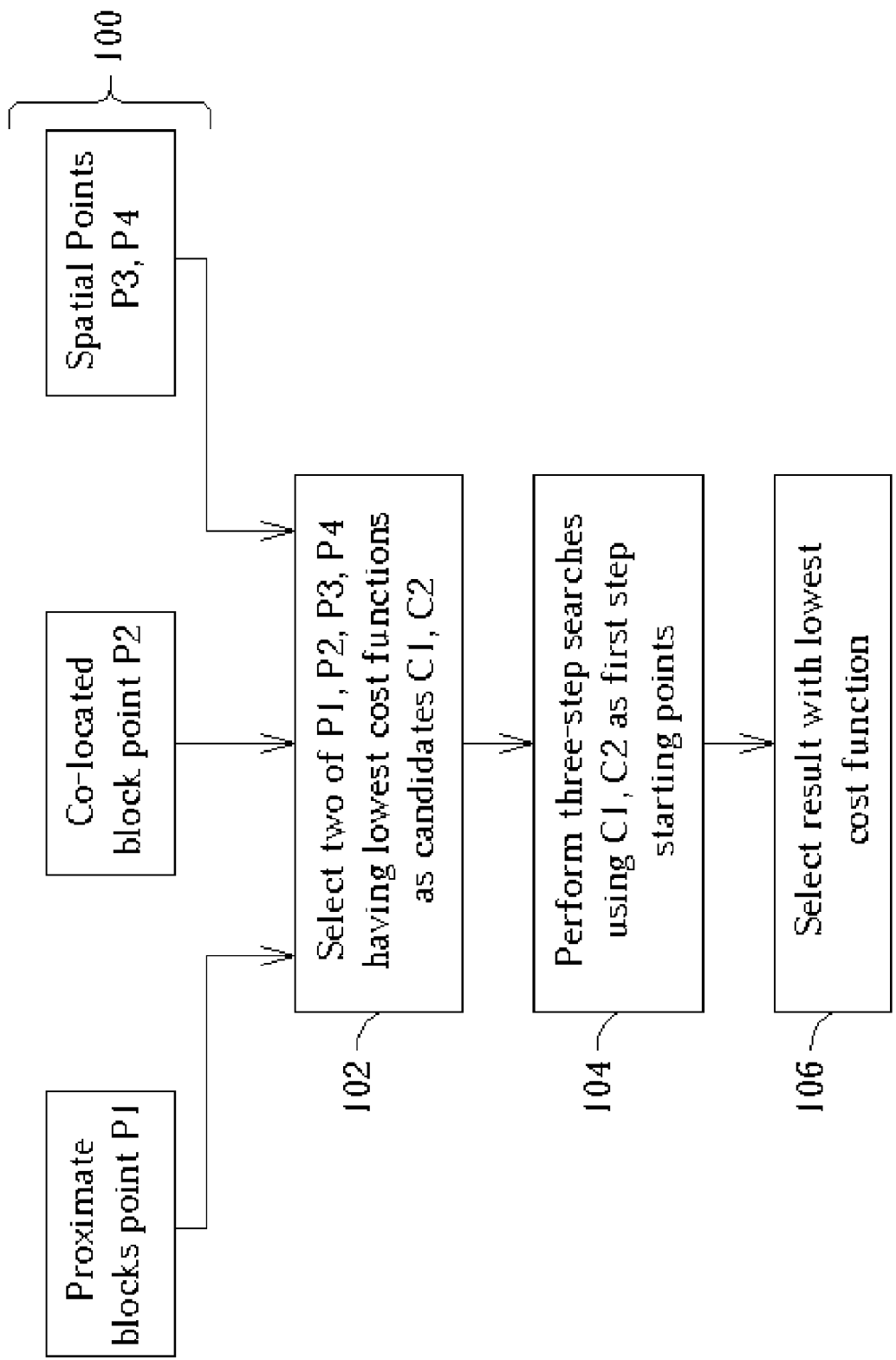
FIG. 5 is a flowchart of a first embodiment of the present invention method.
Figure 6:
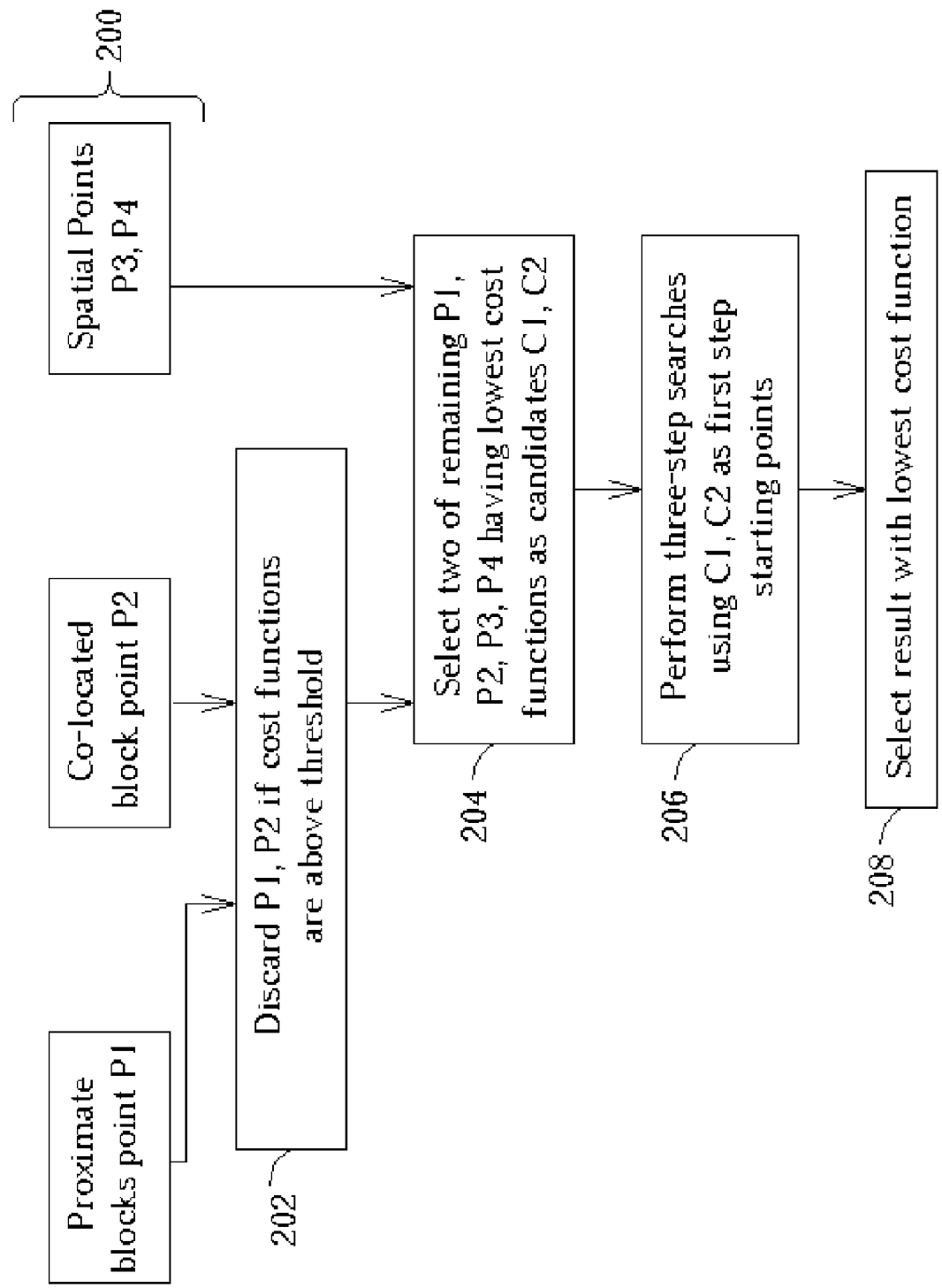
FIG. 6 is a flowchart of a second embodiment of the present invention method.

Determination of the potential motion vector P1 is illustrated in step 100 of the flowchart of FIG. 5 and in step 200 of the flowchart of FIG. 6.

Co-Located Block:

A block 72 at the same relative location in the reference frame as the current block 62 in the current frame 60 is selected. The motion vector of this co-located (or coincident) block 72 is designated as potential motion vector P2. Of course, the co-located block 72 need not be in the reference frame 70 provided it is in a frame other than the current frame 60. Additionally, the co-located block 72 should preferably already have its motion vector determined to prevent redundant calculation.

Determination of the potential motion vector P2 is illustrated in step 100 of the flowchart of FIG. 5 and in step 200 of the flowchart of FIG. 6.

Figure 1:
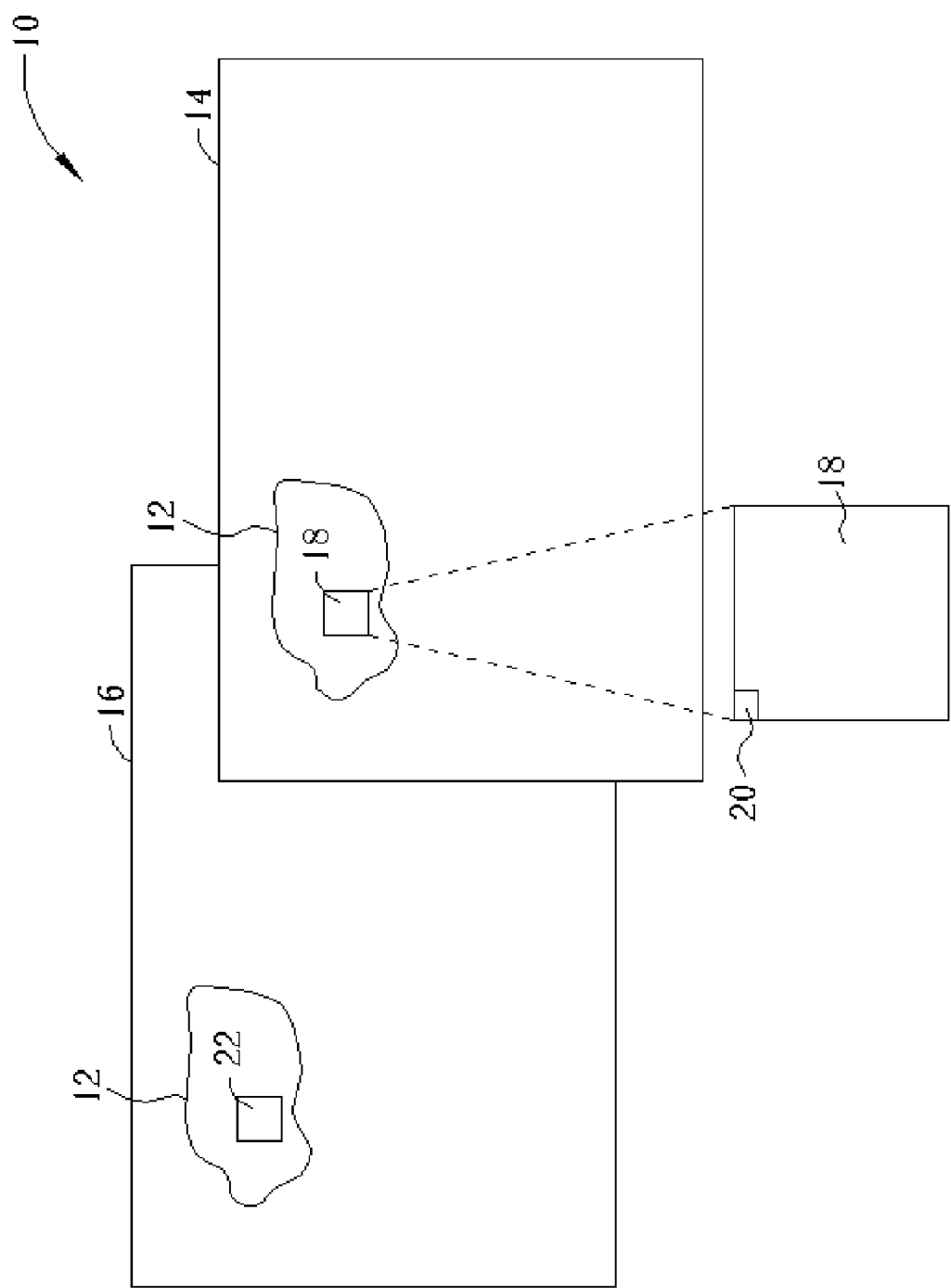
FIG. 1 is a schematic diagram of frames of a digital video.
Figure 2:
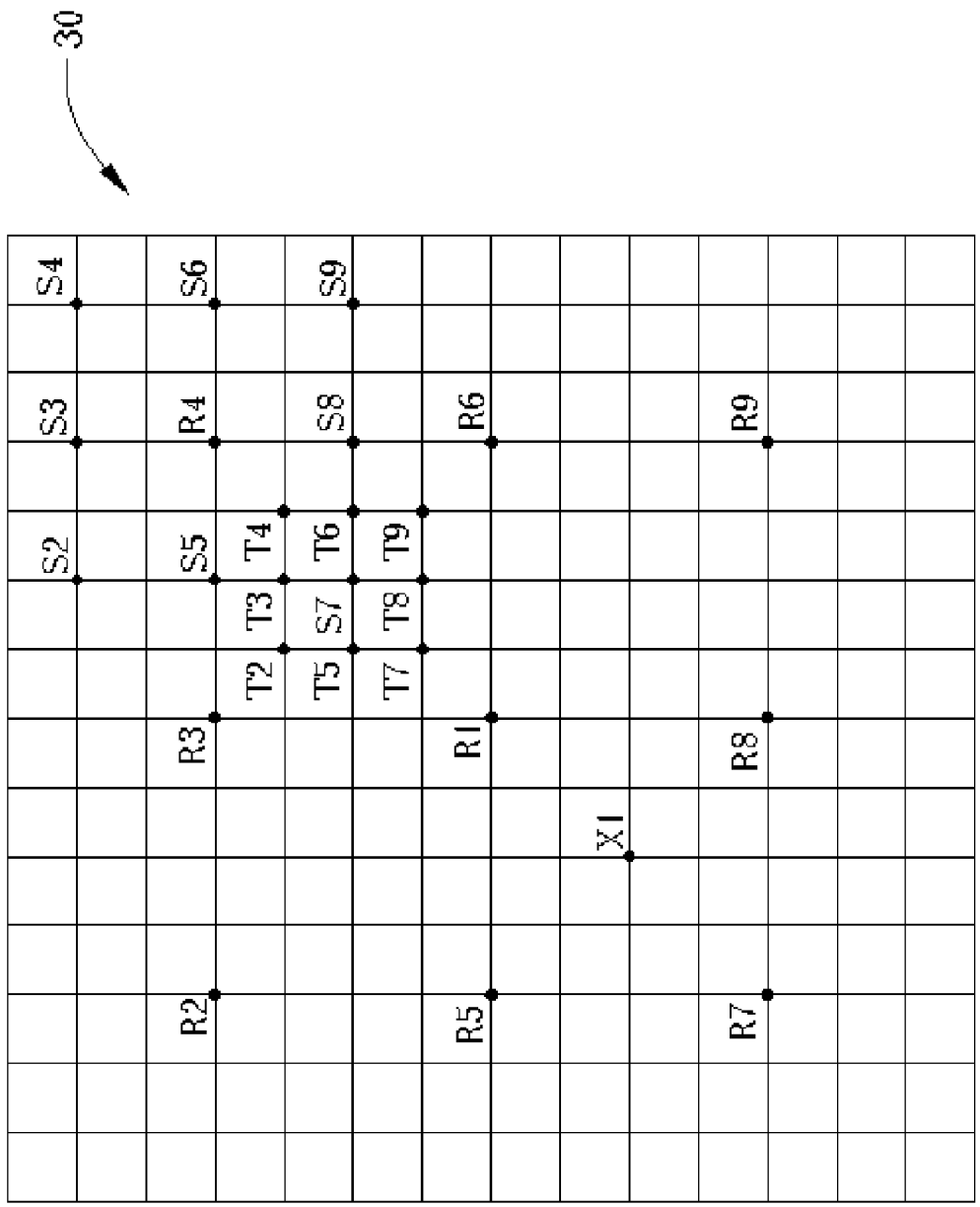
FIG. 2 is a schematic diagram of a three-step motion vectorsearch method according to the prior art.

Predetermined Regions:

Regions indicated by predetermined points, such as the regions R1–R9 of FIG. 2, are selected. In FIG. 2, these points are shown as broken-line circles R, and although they are illustrated in the current frame 60 for convenience, they actually indicate regions in the reference frame 70. The motion vectors corresponding to these points R are used to locate regions in the reference image 70 that are then correlated with the current block on a cost function basis. Motion vectors of two of the regions R having the best correlations, i.e. lowest cost function values, are designated as potential motion vectors P3, P4. Each of the potential motion vectors P3, P4 is selected in much the same way as the resulting point of the first step of the well-known three-step method is determined. In the preferred embodiment, two potential motion vectors P3, P4 are used, however, more or fewer are also acceptable.

Determination of the potential motion vectors P3, P4 is illustrated in step 100 of the flowchart of FIG. 5 and in step 200 of the flowchart of FIG. 6.

Candidate Motion Vectors:

In the present invention, once the potential motion vectors P1, P2, P3, P4 are determined, they are then reduced to two candidate motion vectors C1, C2. This can be done according to a suitable decision rule, two of which are described as follows.

According to the first decision rule, the candidate motion vectors C1, C2 are selected as the two potential motion vectors P1, P2, P3, P4 having the two lowest calculated cost functions. As these cost functions have already been determined when determining the potential motion vectors P1, P2, P3, P4, calculations need not be repeated. The first decision rule is illustrated in step 102 of FIG. 5.

According to the second decision rule, cost functions of the potential motion vectors P1, P2 resulting from the proximate blocks and the co-located block are compared with a suitable threshold value. The potential motion vectors P1, P2 are independently discarded if the respective cost functions are above the threshold value. Then, cost function values of the non-discarded, if any, potential motion vectors P1, P2 and the potential motion vectors P3, P4 from the predetermined regions are compared, with the two potential motion vectors having the two lowest cost functions being selected as the candidate motion vectors C1, C2. The second decision rule is illustrated in steps 202 and 204 of FIG. 6. Naturally, only one candidate motion vector need be determined, however, two provide additional insurance against a local minimum.

Other decision rules are of course possible, with the specific parameters of such being determined based on the service requirements of a device incorporating the present invention method.

Further Correlation and Selection:

After the candidate motion vectors C1, C2 are determined, they are used as starting vectors for any well-known search method. For example, such refinement of the candidate motion vectors C1, C2 can be according to the remaining two steps of the three-step method previously described. After performance of a refining search method, the cost function values of the resulting motion vectors are then compared, with the motion vector having the lowest cost function being selected as the motion vector of the current block. This process is illustrated in FIG. 5 and FIG. 6 as steps 104, 106 and steps 206, 208 respectively.

SUMMARY

In practical application, the above-described method of determining a motion vector of a current block can be performed by the processor 46 of FIG. 3. Instructions executable by the processor 46 that define the method can be stored as the compression algorithm 48 or separately in the RAM 44. The present invention method can be realized with hardware and software, the advantages of each dependant on the specific application.

In contrast to the prior art, the present invention considers motion vectors of proximate blocks, that of a co-located block, and those calculated by predefined search regions to determine a most suitable motion vector for a current block. That is, the present invention method extends a motion vector search area to highly probable and already determined locations outside the predetermined regions. In this way, the present invention reduces the chances of the local minimum problem occurring during digital video compression.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining a motion vector of a current block of a current frame for indicating a region in a reference frame comprising pixel information correlating to the current block, the current frame and reference frame being part of a sequence of frames forming a digital video, the method comprising:

correlating pixel information of the current block with pixel information of the reference frame indicated by a first motion vector of a block proximate to the current block to determine a first cost function;

correlating pixel information of the current block with pixel information of the reference frame indicated by a second motion vector to determine a second cost function, the second motion vector being of a block of the reference frame spatially coincident with the current block;

correlating pixel information of the current block with pixel information of at least a predetermined region of the reference frame to determine at least a third motion vector and corresponding third cost function;

selecting at least one of the first, second, and third motion vectors having the lowest cost function as a candidate motion vector;

correlating pixel information of the current block with pixel information of regions offset from regions in the reference frame indicated by the candidate motion vectors to determine refined candidate motion vectors and corresponding refined cost functions; and selecting the refined candidate motion vector having the lowest refined cost function as the motion vector of the current block.

2. The method of claim 1 wherein correlation of pixel information is performed according to a sum of absolute differences or a sum of squared differences function.

3. The method of claim 1 wherein a plurality of proximate blocks are correlated with, and the first motion vector and first cost function are selected from the proximate block having the lowest cost function.

4. The method of claim 1 wherein a plurality of proximate blocks are correlated with, and the first motion vector and first cost function are selected from the proximate block having the lowest cost function, a mean motion vector of the proximate blocks being selected as the first motion vector if the corresponding mean cost function is the lowest cost function.

5. The method of claim 1 wherein two of the first, second, and third motion vectors having the lowest cost functions are selected as candidate motion vectors.

6. The method of claim 5 wherein nine predetermined regions are correlated with and two third motion vectors and corresponding third cost functions are determined.

7. The method of claim 6 wherein the two third motion vectors are selected from two regions of the nine predetermined regions having the lowest cost functions of correlation with the current block.

8. The method of claim 1 wherein the first and second motion vectors are only under consideration for selection as the candidate motion vectors when the respective first and second cost functions are below a predetermined threshold.

9. The method of claim 1 wherein determining the refined candidate motion vectors and corresponding refined cost functions is iteratively performed twice.

* * * * *